(12) United States Patent
Su et al.

(10) Patent No.: US 11,990,111 B2
(45) Date of Patent: May 21, 2024

(54) NOISE MEASURING DEVICE

(71) Applicant: ASUSTeK COMPUTER INC., Taipei (TW)

(72) Inventors: Sheng-Pin Su, Taipei (TW); Yuan-I Tseng, Taipei (TW); Che-Hung Lai, Taipei (TW); Chien-Yi Wang, Taipei (TW); Chuan-Te Chang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 354 days.

(21) Appl. No.: 17/402,716

(22) Filed: Aug. 16, 2021

(65) Prior Publication Data

US 2022/0093071 A1 Mar. 24, 2022

(30) Foreign Application Priority Data

Sep. 21, 2020 (TW) .................. 109132646

(51) Int. Cl.
| | |
|---|---|
| *G01M 7/00* | (2006.01) |
| *G01H 3/00* | (2006.01) |
| *G01M 99/00* | (2011.01) |
| *G10K 11/16* | (2006.01) |
| *H04R 1/08* | (2006.01) |

(52) U.S. Cl.
CPC ............... *G10K 11/16* (2013.01); *G01H 3/00* (2013.01); *G01M 99/005* (2013.01); *H04R 1/08* (2013.01); *G01M 7/00* (2013.01)

(58) Field of Classification Search
CPC ............ G10K 11/16; G01H 3/00; G01H 3/12; G01M 99/005; G01M 7/00; H04R 1/08
See application file for complete search history.

(56) References Cited

U.S. PATENT DOCUMENTS

2020/0178012 A1* 6/2020 Fletcher ................. A61F 11/08
2020/0326229 A1 10/2020 Hu

FOREIGN PATENT DOCUMENTS

| CN | 207908156 U | | 9/2018 |
|---|---|---|---|
| CN | 210571009 U | | 5/2020 |
| JP | 2007114052 A | * | 5/2007 |
| JP | 2014142290 A | * | 8/2014 |

\* cited by examiner

*Primary Examiner* — Suman K Nath
(74) *Attorney, Agent, or Firm* — McClure, Qualey & Rodack, LLP

(57) ABSTRACT

A noise measuring device is provided. The noise measuring device includes a soundproof box, a sound receiving device, a holding device, and a driving device. The sound receiving device is disposed in the soundproof box. The holding device is disposed in the soundproof box and configured to hold a testing object. The driving device is connected with the soundproof box and configure to drive the soundproof box to rotate.

10 Claims, 7 Drawing Sheets

NOISE MEASURING DEVICE

CROSS-REFERENCE TO RELATED APPLICATION

This application claims the priority benefit of Taiwanese application serial No. 109132646, filed on Sep. 21, 2020. The entirety of the above-mentioned patent application is hereby incorporated by reference herein and made a part of the specification.

BACKGROUND OF THE INVENTION

Field of the Invention

The invention relates to a noise measuring device.

Description of the Related Art

The level of noise generated by an electromechanical device varies with angles/directions, so it is needed to measure the level of noise under different angles/directions. At present, most of the industry uses different jigs to measure the noise level of objects at different angles/directions, which needs to be improved.

BRIEF SUMMARY OF THE INVENTION

According to the first aspect of the disclosure, a noise measuring device is provided. The noise measuring device includes a soundproof box, a sound receiving device, a holding device, and a driving device. The sound receiving device is disposed in the soundproof box. The holding device is disposed in the soundproof box and configured to hold a testing object. The driving device is connected with the soundproof box and configure to drive the soundproof box to rotate.

In summary, the noise measuring device provided herein includes the rotatable soundproof box, and the holding device and the testing object rotate with the soundproof box, thus to better support the noise measurement process in different angles/directions.

These and other features, aspects and advantages of the present invention will become better understood with regard to the following description, appended claims, and accompanying drawings.

DETAILED DESCRIPTION OF THE EMBODIMENTS

Figure 1A:
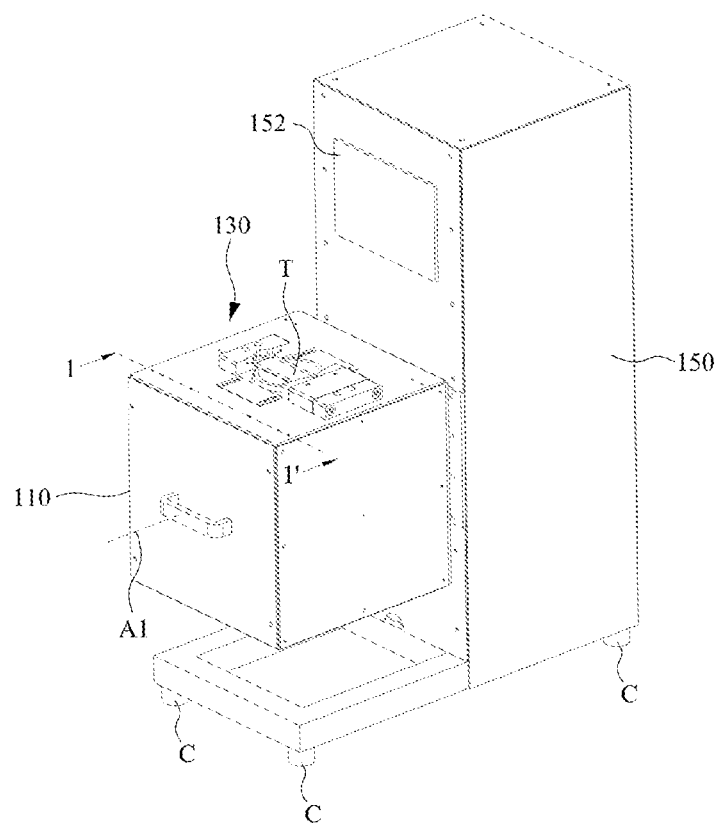
FIG. 1A and FIG. 1B are assembly diagrams of a noise measuring device in two different operating states according to an embodiment.
Figure 1B:
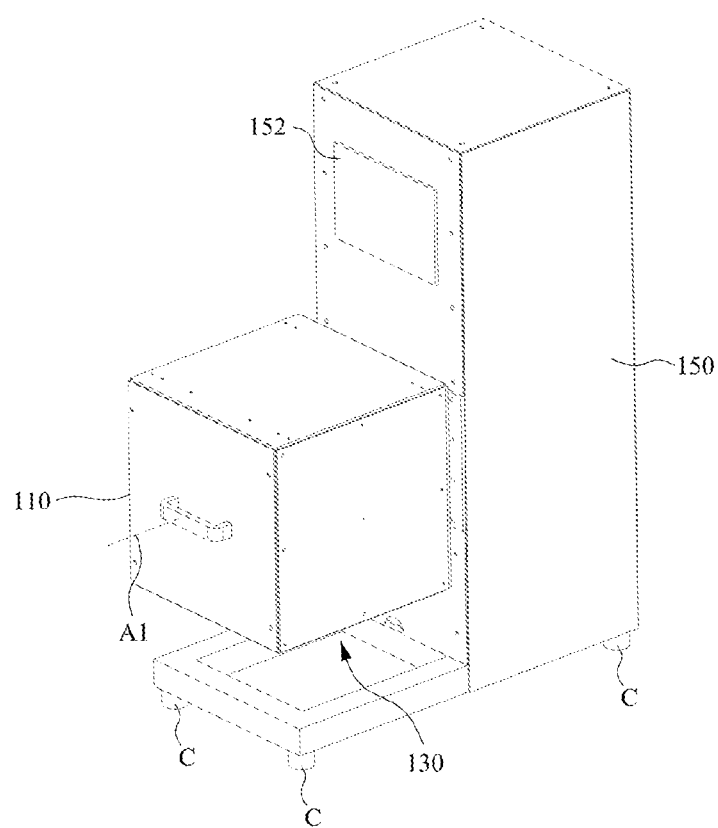

In order to make the description more detailed and complete, please refer to the attached drawings and the various embodiments described below. The elements in the drawings are not drawn to scale, and are provided only to illustrate the present disclosure. Many practical details are described below to provide a comprehensive understanding of the present disclosure. However, those of ordinary skill in the art should understand that the present disclosure can be implemented without one or more practical details, and therefore, these details should not be used to limit the present disclosure.

Please refer to FIG. 1A to FIG. 3, the noise measuring device 100 is configured to measure the noise of a testing object T (take a fan as an example). In an embodiment, the noise measuring device 100 includes a soundproof box 110, a sound receiving device 120, a holding device 130, and a driving device 140 (such as a speed reducer). In an embodiment, the sound receiving device 120 (such as a microphone) is disposed in the soundproof box 110 and records the noise generated by the testing object T. In an embodiment, the holding device 130 is disposed in the soundproof box 110 and holds the testing object T. In an embodiment, the soundproof box 110 has an opening 112, the holding device 130 is disposed in the opening 112, and the testing object T faces the opening 112 of the soundproof box 110, which allows the sound receiving device 120 in the soundproof box 110 to record the noise generated by the testing object T. In one embodiment, the soundproof box 110 includes a casing made of aluminum plate or acrylic. In one embodiment, soundproof cotton (not shown) is disposed on the inner wall of the soundproof box 110.

In an embodiment, the driving device 140 is connected to the soundproof box 110 and drives the soundproof box 110 to rotate. The soundproof box 110 rotates around the axis A1 driven by the driving device 140, and also drives the sound receiving device 120, the holding device 130, and the testing object T disposed in the soundproof box 110 to rotate together. The soundproof box 110 can stay at multiple angles, and the sound receiving device 120 records the noise generated by the testing object T in a static state. In one embodiment, the driving device 140 includes a motor. In one embodiment, the driving device 140 further includes a speed reducer connected to the motor to adjust the output torque of the driving device 140.

Figure 2:
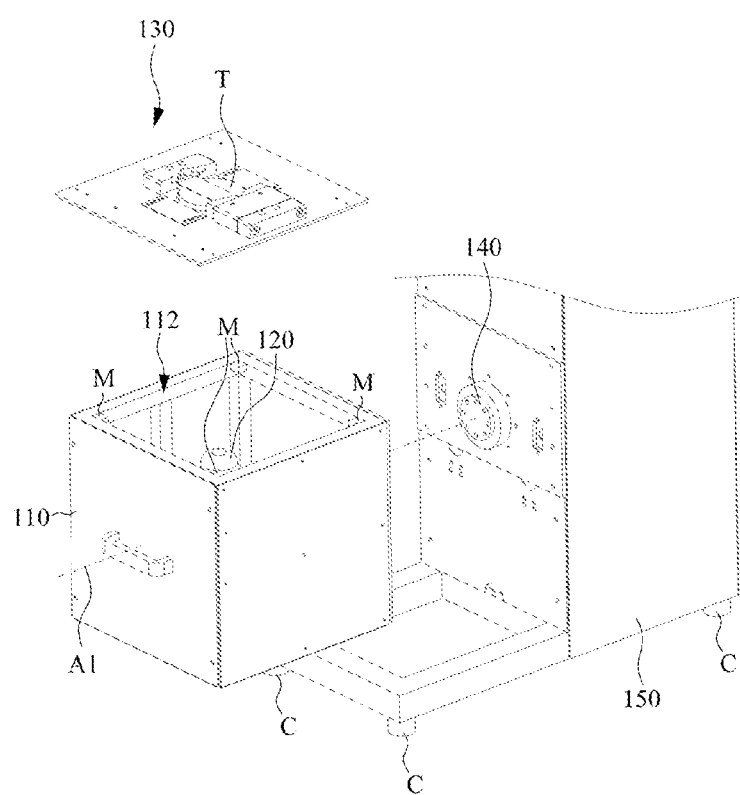
FIG. 2 is an exploded view of the noise measuring device shown in FIG. 1A and FIG. 1B.

As shown in FIG. 1A and FIG. 2, in one embodiment, the axis A1 extends substantially along the horizontal direction. In one embodiment, the driving device 140 drives the soundproof box 110 to rotate between a first position shown in FIG. 1A and a second position shown in FIG. 1B (with a clockwise rotation or a counterclockwise rotation). The opening 112 of the soundproof box 110 and the holding device 130 disposed on the soundproof box 110 face upwards when the soundproof box 110 is in the first position, and the opening 112 of the soundproof box 110 and the holding device 130 disposed on the soundproof box 110 face downward when the soundproof box 110 is in the second position. In one embodiment, the first position and the second position are 180 degrees apart. In one embodiment, the soundproof box 110 is able to stay at any position between the first position and the second position.

As shown in FIG. 1A to FIG. 2, in one embodiment, the noise measuring device 100 further includes a control box 150, and the driving device 140 is disposed in the control box 150. In an embodiment, the control box 150 supplies power to the driving device 140 and control the rotation of the driving device 140. In one embodiment, the control box 150 includes an operation interface 152, and the operation interface 152 includes components such as a touch screen, buttons, and lights for the operator to input commands to control the operation of the noise measuring device 100, or to understand the current operating status of the noise measuring device 100.

In one embodiment, the control box 150 receives control signals/commands regarding the rotation angle, number of rotations, rotation speed, rotation direction (clockwise or counterclockwise) of the soundproof box 110 and other parameters. In one embodiment, the control box 150 receives the control signal/command via the operation interface 152. In one embodiment, the control box 150 further includes a communication interface (not shown, such as RS232), and the control box 150 receives the control signals/commands through the communication interface to control the rotation angle, the number of rotations, the rotation speed and the direction of the soundproof box 110. In one embodiment, the control box 150 is electrically connected to a computer device (not shown), and the computer device control the rotation angle, the number of rotations, the rotation speed and the direction of the soundproof box 110 in response to the received control signals/commands.

In one embodiment, the axis of the driving device 140 has a hollow part, and the hollow part is configured for wires of the control box 150 to pass through, to allow the control box 150 to be electrically connected to the soundproof box 110 or components installed on the soundproof box 110 through the wires.

As shown in FIG. 1A to FIG. 2, in one embodiment, the noise measuring device 100 further includes an anti-vibration pad C, and the anti-vibration pad C is disposed at the bottom of the control box 150. In one embodiment, the anti-vibration pad C includes a rubber pad.

Figure 3:
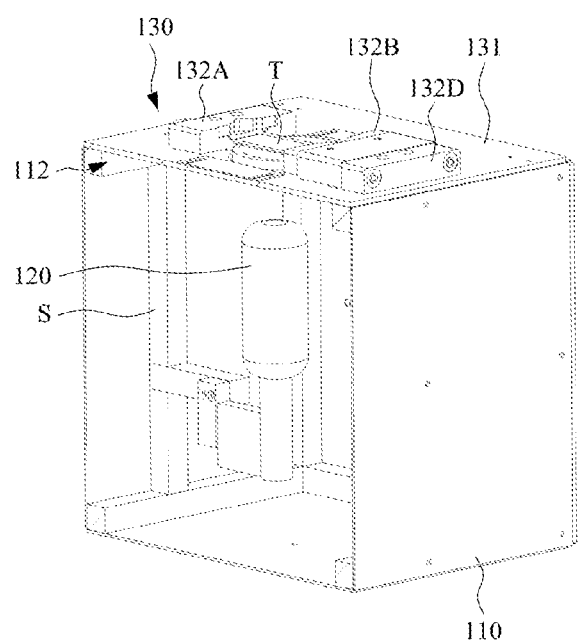
FIG. 3 is a three-dimensional cross-sectional view of a soundproof box of the noise measuring device shown in FIG. 1A and FIG. 1B along the wire 1-1'.

As shown in FIG. 3, in one embodiment, an adjustable bracket S is disposed in the soundproof box 110, and the sound receiving device 120 is installed on the bracket S, therefore, the position of the sound receiving device 120 relative to the testing object T is changed by adjusting the bracket S (for example, adjusting the height of the sound receiving device 120).

As shown in FIG. 1A to FIG. 3, in one embodiment, the holding device 130 is detachably covered on the opening 112 of the soundproof box 110 to facilitate the replacement of the holding device 130 corresponding to different testing object T. In one embodiment, the holding device 130 is detachably covered on the opening 112 of the soundproof box 110 through at least one magnet M. In an embodiment, the magnet M is fixed on the soundproof box 110 and arranged around the opening 112 of the soundproof box 110, and the holding device 130 is attracted and fixed by the magnet M. In an alternative embodiment, the magnet M is fixed to the holding device 130 instead, and is attracted to the soundproof box 110.

Figure 4:
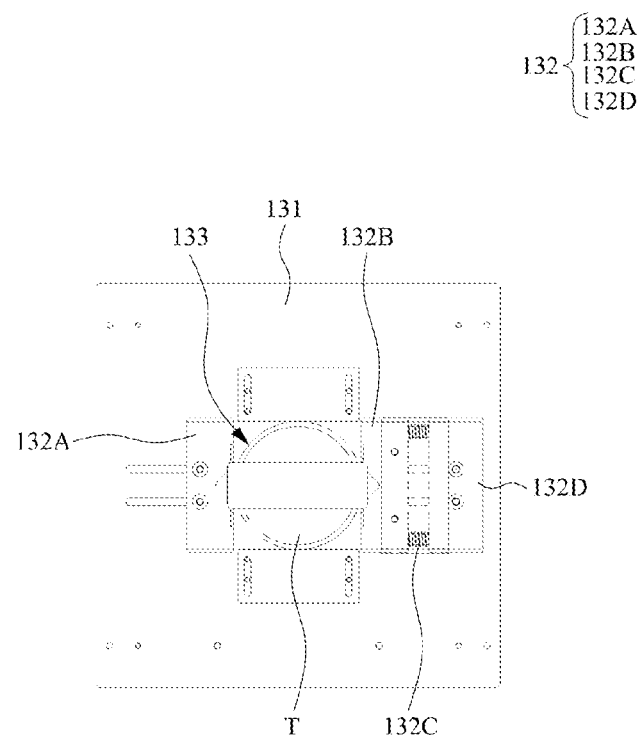
FIG. 4 is a top view showing a holding device of the noise measuring device shown in FIG. 1A and FIG. 1B, in which the obscured internal structure is indicated by a dashed wire.

Please refer to FIG. 4 together. As shown in FIG. 3 and FIG. 4, in one embodiment, the holding device 130 includes a cover 131 and a fixing mechanism 132. The cover 131 covers the opening 112 of the soundproof box 110 and has a through hole 133. The fixing mechanism 132 is arranged on the cover 131 and configured to fix the testing object T in the through hole 133.

As shown in FIG. 3 and FIG. 4, in one embodiment, the fixing mechanism 132 includes a first clamping part 132A and a second clamping part 132B, and the first clamping part 132A and the second clamping part 132B are located on opposite sides of the through hole 133 of the cover 131. The first clamping part 132A is fixedly disposed on the cover 131, and the second clamping part 132B is slidably disposed on the cover 131 to adjust the distance between the second clamping part 132B and the first clamping part 132A. The first clamping part 132A and the second clamping part 132B clamp the testing object T to fix the testing object T in the through hole 133.

As shown in FIG. 3 and FIG. 4, in one embodiment, the fixing mechanism 132 further includes an elastic element 132C (a spring is taken as an example in the figure). The elastic element 132C is connected to the second clamping part 132B and applies force to the second clamping part 132B towards the direction of the first clamping part 132A, so that the first clamping part 132A and the second clamping part 132B firmly clamp the testing object T.

As shown in FIG. 3 and FIG. 4, in one embodiment, the fixing mechanism 132 further includes a fixing seat 132D. The fixing seat 132D is fixed to the cover 131 and is located on a side of the second clamping part 132B away from the first clamping part 132A. The elastic element 132C is connected between the fixing seat 132D and the second clamping part 132B. The elastic element 132C is in a compressed state to apply a force in the direction of the first clamping part 132A to the second clamping part 132B.

Figure 5:
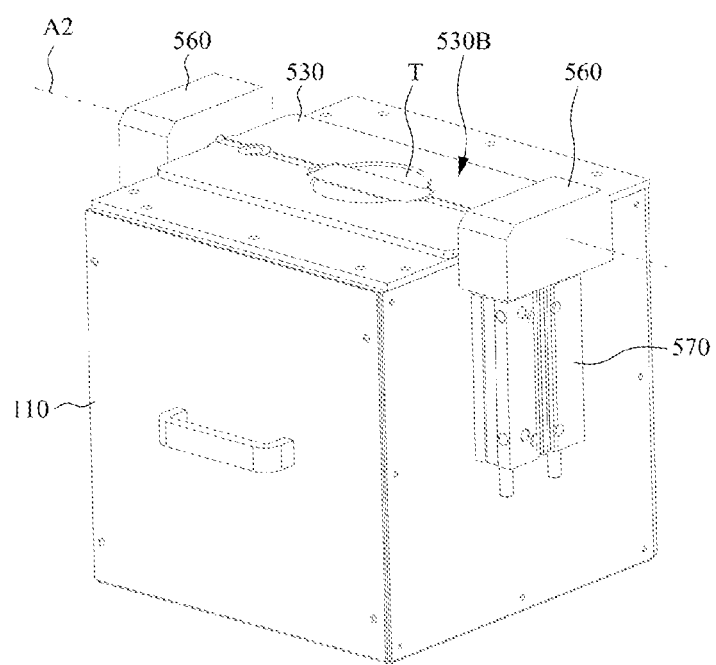
FIG. 5 and FIG. 6 are three-dimensional diagrams showing the soundproof box and the holding device of the noise measuring device in two different operating states according to another embodiment.
Figure 6:
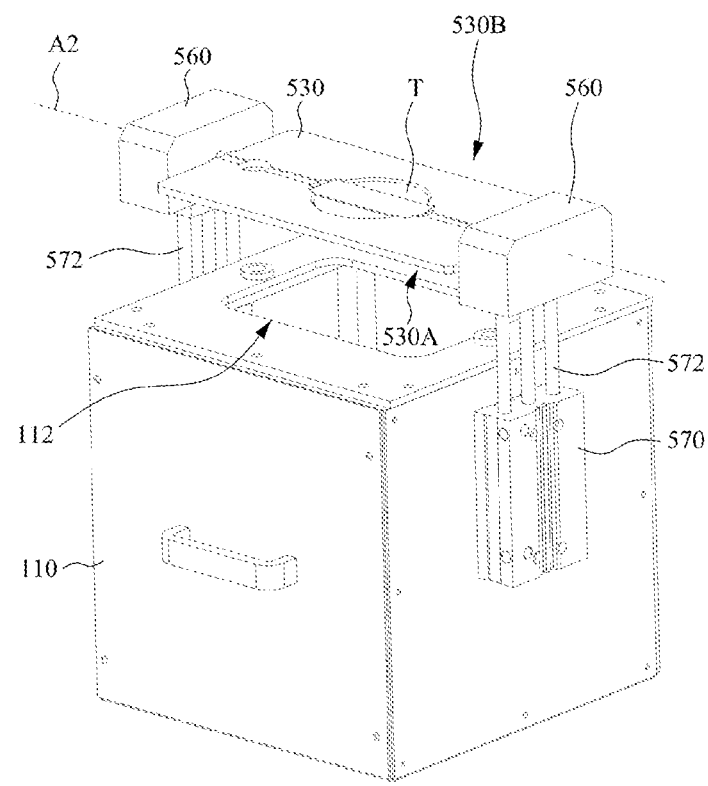

Please refer to FIG. 5 and FIG. 6, a difference between this embodiment and the previous embodiment is that the holding device 530 is rotatably disposed on the soundproof box 110. Specifically, the holding device 530 rotates around the axis A2 relative to the soundproof box 110. In this way, the testing object T fixed by the holding device 530 changes its side to face the soundproof box 110 as the holding device 530 rotates, allowing the sound receiving device 120 to measure the noise values on both sides of the testing object T.

As shown in FIG. 5 and FIG. 6, in one embodiment, the noise measuring device further includes a rotating mechanism 560 (such as a motor or a pneumatic cylinder). The rotating mechanism 560 is connected to the holding device 530 and drives the holding device 530 to rotate to the first state and the second state. The holding device 530 includes a first side 530A and a second side 530B opposite to each other. In the first state (the state shown in the figure), the first side 530A of the holding device 530 faces the soundproof box 110, and in the second state, the second side 530B of the holding device 530 faces the soundproof box 110.

As shown in FIG. 5 and FIG. 6, in one embodiment, the noise measuring device further includes a displacement mechanism 570 (such as a lifting cylinder). The displacement mechanism 570 is connected to the holding device 530 and drives the holding device 530 to move away from the soundproof box 110, to prevent the holding device 530 from colliding with the soundproof box 110 or the sound receiving device 120 when rotating and turning over.

In one embodiment, the hollow part of the driving device 140 is configured for the wires (such as power wires and control wires) of the control box 150 to pass through. The control box 150 is electrically connected to the rotating mechanism 560 and the displacement mechanism 570 through these wires to supply power to the rotating mechanism 560 and the displacement mechanism 570 and transmit control signals to drive the rotating mechanism 560.

As shown in FIG. 5 and FIG. 6, in one embodiment, after the displacement mechanism 570 drives the holding device 530 to move away from the soundproof box 110, the rotating mechanism 560 rotates the holding device 530 (and the testing object T fixed on the holding device 530) around the axis A2, to change the side of the holding device 530 (and the testing object T fixed on the holding device 530) to face the soundproof box 110. In one embodiment, after the rotating mechanism 560 rotates the holding device 530 to change the side of the testing object T to face the soundproof box 110, the displacement mechanism 570 drives the holding device 530 to move toward the soundproof box 110 and return to its original position to prepare for the next stage of noise measurement.

As shown in FIG. 5 and FIG. 6, in one embodiment, the displacement mechanism 570 is fixed on the soundproof box 110 (specifically, fixed on both sides of the soundproof box 110), and includes a moveable actuation lever 572. The actuation lever 572 is connected to the rotating mechanism 560, and drives the rotating mechanism 560 to move synchronously with the holding device 530.

In summary, the noise measuring device provided includes the rotatable soundproof box, and the holding device and the testing object rotate with the soundproof box to support noise measurement in different angles/directions.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A noise measuring device, comprising:
   a soundproof box;
   a sound receiving device, disposed in the soundproof box;
   a holding device, disposed on the soundproof box and configured to hold a testing object, wherein the sound receiving device is configured to record noise generated by the testing object; and
   a driving device, connected with the soundproof box and configure to drive the soundproof box to rotate.

2. The noise measuring device according to claim 1, wherein the soundproof box also has an opening, and the holding device detachably covers the opening of the soundproof box.

3. The noise measuring device according to claim 2, wherein the holding device detachably covers the opening of the soundproof box through at least one magnet.

4. The noise measuring device according to claim 1, wherein the holding device comprises:
   a cover, covering an opening of the soundproof box and having a through hole; and
   a fixing mechanism, configured to fix the testing object in the through hole.

5. The noise measuring device according to claim 4, wherein the fixing mechanism comprises:
   a first clamping part, fixed disposed on the cover; and
   a second clamping part, slidably disposed on the cover, wherein the first clamping part and the second clamping part are located on opposite sides of the through hole and configured to clamp the testing object.

6. The noise measuring device according to claim 5, wherein the fixing mechanism further comprises:
   at least one elastic element, connected with the second clamping part and configured to apply force to the second clamping part towards a direction of the first clamping part.

7. The noise measuring device according to claim 1, wherein the holding device is rotatably disposed on the soundproof box.

8. The noise measuring device according to claim 7, further comprising:
   a rotating mechanism, connected to the holding device and configured to drive the holding device to rotate to a first state and a second state, wherein a first side of the holding device faces the soundproof box in the first state, and a second side of the holding device faces the soundproof box in the second state, and the second side is opposite to the first side.

9. The noise measuring device according to claim 7, further comprising:
   a displacement mechanism, connected to the holding device, and configured to drive the holding device to move away from the soundproof box.

10. The noise measuring device according to claim 9, further comprising:
    a rotating mechanism, configured to rotate the holding device to change a side of the holding device facing the soundproof box after the displacement mechanism drives the holding device to move away from the soundproof box.

* * * * *